United States Patent
Guo et al.

(10) Patent No.: US 10,499,221 B2
(45) Date of Patent: Dec. 3, 2019

(54) COMMUNICATION DEVICE AND COMMUNICATION METHOD

(71) Applicant: Sony Corporation, Tokyo (JP)

(72) Inventors: Xin Guo, Beijing (CN); Chen Sun, Beijing (CN); Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 15/544,437

(22) PCT Filed: Jan. 26, 2016

(86) PCT No.: PCT/CN2016/072119
§ 371 (c)(1),
(2) Date: Jul. 18, 2017

(87) PCT Pub. No.: WO2016/119674
PCT Pub. Date: Aug. 4, 2016

(65) Prior Publication Data
US 2018/0270635 A1 Sep. 20, 2018

(30) Foreign Application Priority Data
Jan. 30, 2015 (CN) .......................... 2015 1 0050840

(51) Int. Cl.
*H04W 24/10* (2009.01)
*H04W 8/00* (2009.01)
(Continued)

(52) U.S. Cl.
CPC .............. *H04W 4/70* (2018.02); *H04W 8/005* (2013.01); *H04W 24/10* (2013.01); *H04W 72/04* (2013.01);
(Continued)

(58) Field of Classification Search
CPC ......... H04W 72/0473; H04W 72/0406; H04W 4/70; H04W 84/20; H04W 24/10
See application file for complete search history.

(56) References Cited

U.S. PATENT DOCUMENTS 9,553,810 B2 * 1/2017 Cardona ................ H04L 47/127
2005/0021845 A1 * 1/2005 Yasui ...................... H04W 4/00
709/238
(Continued)

FOREIGN PATENT DOCUMENTS

CN 102638893 A 8/2012
CN 104285457 A 1/2015
(Continued)

OTHER PUBLICATIONS

International Search Report dated Apr. 28, 2016 in PCT/CN2016/072119 filed Jan. 26, 2016.

*Primary Examiner* — Rasheed Gidado
(74) *Attorney, Agent, or Firm* — Xsensus LLP

(57) ABSTRACT

The present disclosure relates to a communication device and a communication method. The communication device according to one embodiment comprises an acquisition unit, a determining unit, and a trigger unit. The acquisition unit is configured to acquire distribution information of user devices in a dynamic network, said user devices at least comprising a slave device, the slave device in device-to-device communication acquiring a communication service by means of a master device. The determined unit is configured to determining a re-configuration method of the dynamic network on the basis of the acquired information. The trigger unit is configured to trigger the re-configuration of the dynamic network on the basis of the determined method.

15 Claims, 14 Drawing Sheets

(51) Int. Cl.
  *H04W 84/20* (2009.01)
  *H04W 4/70* (2018.01)
  *H04W 72/04* (2009.01)
  *H04W 16/18* (2009.01)

(52) U.S. Cl.
  CPC ....... *H04W 72/0473* (2013.01); *H04W 84/20* (2013.01); *H04W 16/18* (2013.01); *H04W 72/0406* (2013.01)

(56) References Cited

U.S. PATENT DOCUMENTS

| | | | | |
|---|---|---|---|---|
| 2007/0223398 | A1* | 9/2007 | Luo | H04W 4/08 370/254 |
| 2010/0214951 | A1* | 8/2010 | Takemura | H04L 41/0853 370/254 |
| 2012/0093098 | A1* | 4/2012 | Charbit | H04W 72/04 370/329 |
| 2014/0321355 | A1* | 10/2014 | Choi | H04B 7/15507 370/315 |
| 2015/0126188 | A1 | 5/2015 | Lindoff et al. | |
| 2015/0139111 | A1* | 5/2015 | Fodor | H04W 52/12 370/329 |
| 2015/0249979 | A1* | 9/2015 | Kim | H04W 76/14 370/329 |
| 2015/0296411 | A1* | 10/2015 | Meyer | G08G 1/0112 370/336 |
| 2016/0119854 | A1* | 4/2016 | Guo | H04L 67/1051 370/315 |
| 2016/0309355 | A1* | 10/2016 | Seo | H04W 8/005 |

FOREIGN PATENT DOCUMENTS

| | | |
|---|---|---|
| CN | 104285496 A | 1/2015 |
| WO | WO 2014/196906 A1 | 12/2014 |

* cited by examiner

COMMUNICATION DEVICE AND COMMUNICATION METHOD

FIELD

The present disclosure relates to the field of communication, and more particularly, to a communication device for a dynamic network and a communication method performed by the communication device.

BACKGROUND

With rapid development of the computer and communication technology, the numbers of user equipments, service requirements and usage scenarios increase exponentially, thereby further intensifying a contradiction between wireless service requirements and wireless spectrum resources. A dynamic network tries to ensure effective utilizing of the resources while satisfying a user requirement by continuously adjust a network configuration (including function of network node and data transmission path and so on) during a network operation process thereby further exploit reusing efficiency of the radio resource.

SUMMARY

One characteristic of a dynamic network is to support diversity and variability of access terminals and mobile user equipments. In a conventional network management method, movement, power, change of switch state or the like of a mobile user equipment can not be tracked quickly according to channel quality measurement and feedback of the mobile user, therefore it is difficult to timely response to a rapidly changing network state, and thus it may result in that the mobile user can not obtain a stable access and service, thereby influencing a spectrum utilization and a system capacity of a whole network.

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. The object of the summary is only to give some concepts of the present disclosure in a simplified form, as a preamble of the detailed description later.

According to an embodiment, a communication device is provided. The communication device includes an acquiring unit, a determining unit and a triggering unit. The acquiring unit is configured to acquire information on distribution of user equipments in a dynamic network, where the user equipments include at least a slave device which obtains a communication service via a master device during a device-to-device communication. The determining unit is configured to determine a reconfiguration scheme of the dynamic network according to the acquired information. The triggering unit is configured to trigger a reconfiguration to be performed on the dynamic network according to the determined scheme.

According to another embodiment, a communication method performed by a communication device is provided. The method includes: acquiring information on distribution of user equipments in a dynamic network, where the user equipments include at least a slave device which obtains a communication service via a master device during a device-to-device communication; determining a reconfiguration scheme of the dynamic network according to the acquired information; and triggering a reconfiguration to be performed on the dynamic network according to the determined scheme.

According to yet another embodiment, a communication device for user side is provided. The communication device includes a receiving unit and a transmitting unit. The receiving unit is configured to receive a transmitting request from a user equipment or a network infrastructure. The transmitting unit is configured to transmit, in response to the transmitting request, a reference signal for determining the distribution of the communication device in a dynamic network in a case where the communication device does not serve as a slave device which obtains a communication service via a master device during a device-to-device communication.

According to still another embodiment, a communication method performed by a communication device is provided. The method includes receiving a transmitting request from a user equipment or a network infrastructure. In addition, the method further includes transmitting, in response to the transmitting request, a reference signal for determining the distribution of the communication device in a dynamic network in a case where the communication device does not serve as a slave device which obtains a communication service via a master device during a device-to-device communication.

According to the embodiment of the present disclosure, a reconfiguration on a dynamic network containing a device-to-device communication is determined and triggered according to the distribution of user equipments in the dynamic network, thereby being beneficial for ensuring a stability of a user access link and improving a spectrum utilization of a network and a system capacity.

BRIEF DESCRIPTION OF THE DRAWINGS

The present disclosure may be understood better with reference to the description given in conjunction with drawings hereinafter. Same or similar reference numerals are used to indicate the same or similar components throughout the drawings. The drawings, together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
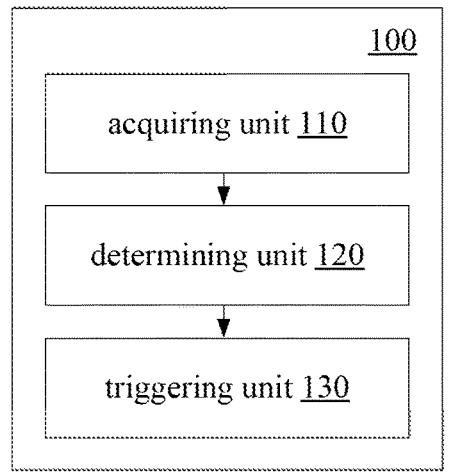
FIG. 1 is a block diagram of a configuration example of a communication device according to an embodiment of the present disclosure.

Hereinafter embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clarity.

As shown in FIG. 1, a communication device 100 according to an embodiment of the present disclosure includes an acquiring unit 110, a determining unit 120 and a triggering unit 130.

The acquiring unit 110 is configured to acquire information on a distribution of user equipments in a dynamic network. The distribution information acquired by the acquiring unit 110 includes at least information on a distribution of a slave device. The slave device is, for example, a user equipment which obtains a communication service via a master device during a device-to-device (D2D) communication. In some examples, the slave device is machine-to-machine (M2M) device which transmits data via the master device during an M2M communication. In addition, according to specific applications, the distribution information acquired by the acquiring unit 110 may also include the distribution information of a master device. Accordingly, the master device is, for example, a user equipment which forwards data to another D2D/M2M device during a D2D/M2M communication. For example, the master device may communicate with a network infrastructure such as a base station.

Figure 2:
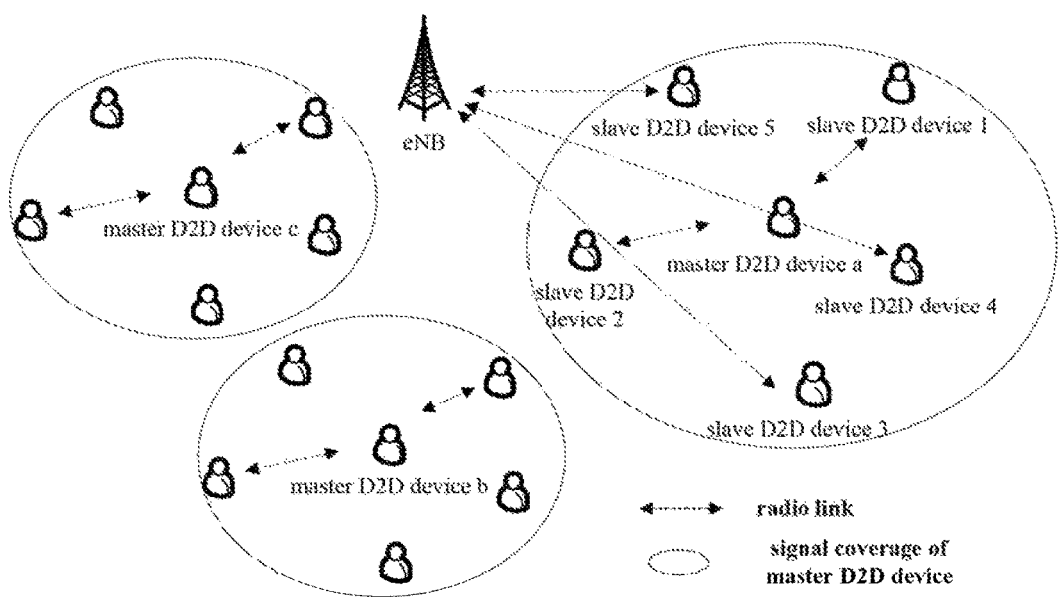
FIG. 2 is a schematic diagram of an example of a communication system to which an embodiment of the present disclosure may be applied.

FIG. 2 shows an example of a communication system to which an embodiment of the present disclosure may be applied. As an example, FIG. 2 shows a communication system in a D2D communication scene based on 3GPP, and subsequent embodiments are described mainly for such application scene. However, scenes to which the embodiments of the present disclosure may be applied are not limited to the example. The embodiments of the present disclosure may also be applied to other dynamic networks, such as a P2P network, an Ad hoc network and a heterogeneous network based on WiFi, etc.

The exemplary system shown in FIG. 2 includes a base station (such as an eNB) and multiple communication devices, where the communication devices include a master device such as a master D2D device A, a master D2D device B and a master D2D device C, and a slave D2D device. A slave D2D device located in a signal coverage of a respective master D2D device may perform data communication with the respective master D2D device, and may obtain other communication services via the respective master D2D device, for example communicating with the eNB and acquiring services such as radio resource management via the respective master D2D device.

The communication device 100 according to the embodiment of the present disclosure may be implemented as a communication device on user equipment side such as a master D2D device or may be implemented as a communication device on base station side. In addition, functions of the communication device 100 may be achieved in cooperation by devices distributed on the user side and the base station side.

Referring to FIG. 1 again, the determining unit 120 is configured to determine a reconfiguration scheme of the dynamic network according to the information acquired by the acquiring unit 110.

For example, the reconfiguration scheme may include a reselection of the master device and/or a resetting of an operation parameter of the master device. More specifically, the resetting of the operation parameter of the master device includes adjusting a transmission power of the master device and/or adjusting a slave device served by the master device (for example, adjusting a device ID in a slave device list). It should be noted that, the reselection of a master device generally corresponds to a case where the communication device 100 is implemented as a device on base station side, but the present disclosure is not limited thereto. For example, in an application scene where a user equipment (UE) may serve as a central management node, the communication device 100 on the UE side (for example a cluster head of a D2D device cluster) may be configured to perform the reselection of a master device.

The triggering unit 130 is configured to trigger a reconfiguration to be performed on the dynamic network according to the scheme determined by the determining unit 120. For example, the triggering unit 130 may notify a corresponding device to perform the reconfiguration by a control signaling. In an example in which the communication device 100 is implemented as a device on base station side, the triggering unit 130 may notify the corresponding master device to reconfigure a D2D transmission power, for example, by power control information carried by a physical downlink control channel (PDCCH), and notify the corresponding master device to adjust a slave user served by the master device by, for example, a control element of a MAC layer carried on a physical downlink shared channel (PDSCH). In an example in which the communication device 100 is implemented as a device on user side such as a master device, the triggering unit 130 transmits a message of stopping the D2D communication to a slave device to be released by high-layer signaling carried on a physical uplink shared channel (PUSCH), so as to trigger a reconfiguration.

As described above, the processing performed by the communication device 100 according to the embodiment of the present disclosure may be performed on the user equipment side, the base station side or may be performed by the user equipment side in cooperation with the base station side. Next, exemplary manners for triggering distribution measurement of a user equipment in a dynamic network according to an embodiment of the present disclosure and determining a configuration of the dynamic network are described with reference to FIG. 3 to FIG. 5 respectively.

Figure 3:
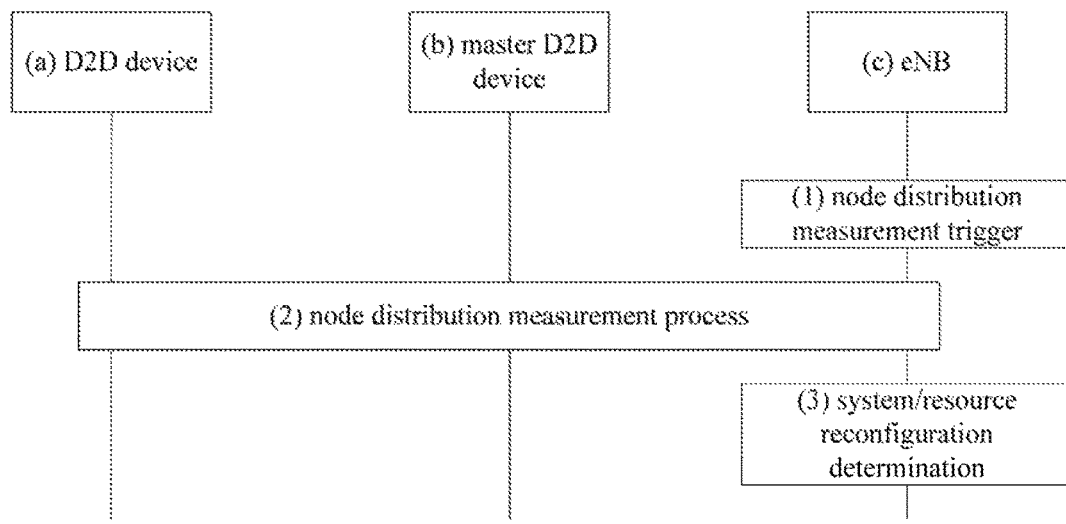
FIG. 3 is a schematic diagram of an exemplary process according to an embodiment of the present disclosure.

FIG. 3 shows an example in which node distribution measurement triggering and system reconfiguration determination are both performed on base station side.

In process (1), an eNB triggers a node measurement. Feasible triggering conditions may include: the eNB needs to perform resource allocation and scheduling on a D2D device based on a node distribution measurement result. For example, the eNB determines to adjust a power level of the D2D device or adjust an available resource pool such as a resource pool for D2D discovery and a resource pool for D2D communication, based on a change in network state.

In process (2), node distribution measurement is performed between the related devices such as the eNB, a master D2D device or a D2D device.

In process (3), the eNB determines a system/resource reconfiguration according to a result of the node distribution measurement.

Figure 4:
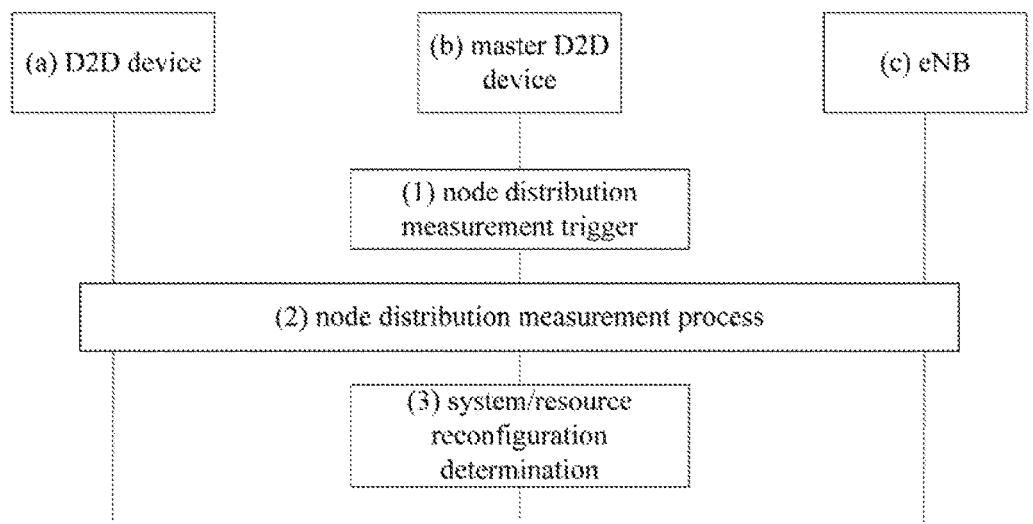
FIG. 4 is a schematic diagram of another exemplary process according to an embodiment of the present disclosure.

FIG. 4 shows an example in which a master D2D device performs node distribution measurement triggering and system reconfiguration determination.

In process (1), the master D2D device triggers a node distribution measurement. Feasible triggering conditions may include: a change of the available resource of the master D2D device, for example the eNB notifies the master D2D device to change a power or an selectable resource pool; a change of the state of the master D2D device itself, for example a periodical timing apparatus provided in the master D2D device for triggering distribution measurement is started, the mobility of the master D2D device changes (for example, the position begins to change and a measurement reporting event which may result in a switching occurs), or the battery level is lower than a threshold, and a change of state of a slave D2D device served by the master D2D device, for example a reduction of throughout or a reduction of link quality.

In process (2), node distribution measurement is performed between the related devices such as the eNB, the master D2D device or a D2D device.

In process (3), the master D2D device determines a system/resource reconfiguration based on a result of the node distribution measurement.

Figure 5:
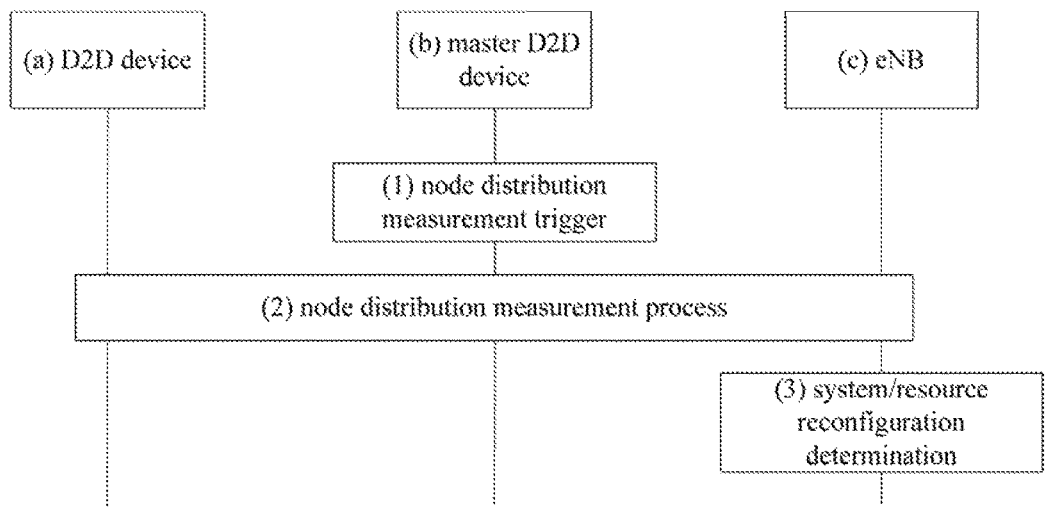
FIG. 5 is a schematic diagram of yet another exemplary process according to an embodiment of the present disclosure.

FIG. 5 shows an example in which a master D2D device triggers a node distribution measurement and an eNB determines a system reconfiguration.

In process (1), the master D2D device triggers node distribution measurement. Feasible triggering conditions are similar to those described above with reference to FIG. 4.

In process (2), node distribution measurement is performed between the related devices such as the eNB, the master D2D device or a D2D device.

In process (3), the eNB determines a system/resource reconfiguration according to a result of the node distribution measurement.

Next, specific embodiments in which the communication device is a master user equipment and a network infrastructure are described respectively.

According to an embodiment, the communication device is a master user equipment. In other words, another communication device may obtain a communication service via the communication device according to the embodiment, for example, for performing data communication with a base station or obtaining a radio resource management service from the base station and so on.

Figure 6:
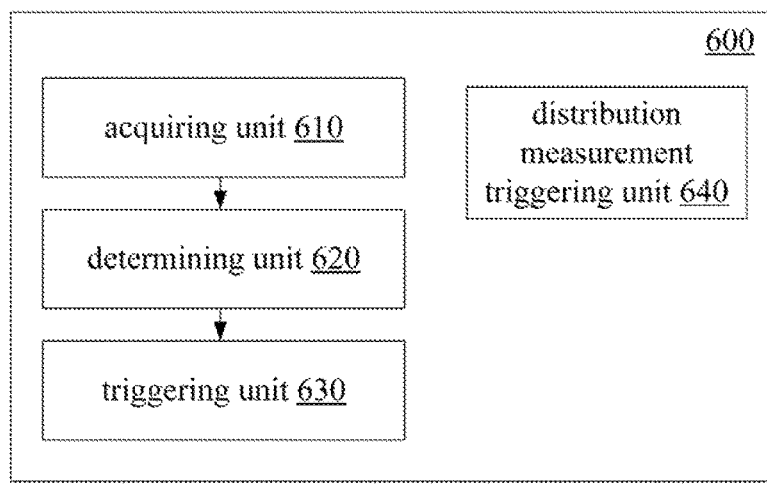
FIG. 6 is a block diagram of a configuration example of a communication device according to another embodiment of the present disclosure.

FIG. 6 shows a configuration example of a communication device 600 according to an embodiment of the present disclosure. The communication device 600 includes an acquiring unit 610, a determining unit 620, a triggering unit 630 and a distribution measurement triggering unit 640. Configurations of the acquiring unit 610, the determining unit 620 and the triggering unit 630 are similar to the configurations of the acquiring unit 110, the determining unit 120 and the triggering unit 130 described above with reference to FIG. 1. The information on distribution of user equipments acquired by the acquiring unit 610 may include information on distribution of user equipments in a range served by the communication device 600, i.e., a signal coverage. The distribution information includes a density of the user equipments, for example.

The distribution measurement triggering unit 640 is configured to trigger, based on a predetermined event, the user equipment in the signal coverage of the communication device 600 to transmit a distribution measurement signal, for the acquiring unit 610 to determine the information on the distribution of the user equipments.

For example, the distribution measurement triggering unit 640 may trigger a distribution measurement based on one or more of the following events:

(1) a change in a mobility characteristic of the communication device 600 satisfies a predetermined condition, for example, a change of position, speed or moving direction, or occurrence of cell handover, a carrier aggregation change (for example increasing or decreasing of secondary cells), or a dual connection change (for example establishing or releasing of a dual connection with a base station), etc.;

(2) a change in signal transmission parameter of the communication device 600 exceeds a predetermined threshold, where the signal transmission parameter may include, for example, a power configured by the base station, a modulation and coding scheme (MCS), an available resource pool between the served slave user equipment, etc, and may also include a change in transmission power caused by a change in battery level of the communication device 600 itself;

(3) a timer for triggering distribution measurement satisfies a timing condition, where the condition corresponds to an overall configuration of distribution measurement performed periodically; and (4) a communication state between the communication device 600 and a slave user equipment served by the communication device 600 satisfies a predetermined condition, for example, a channel quality is lower than a predetermined level.

In addition, the distribution measurement triggering unit 640 may trigger a user equipment in the signal coverage of the communication device 600 to transmit a distribution measurement signal by at least one of:

(1) transmitting a broadcast signal related to a distribution measurement request (a first broadcast signal) to user equipments in the signal coverage of the communication device 600, for example, a reference signal for D2D communication (including a D2D discovery signal, a D2D synchronization signal or a newly defined signal and so on); and (2) transmitting a distribution measurement request message to a serving base station of the communication device 600, so as to trigger, via the serving base station, the user equipment in the signal coverage of the communication device 600 to transmit a distribution measurement signal.

Exemplary processes in which a master D2D device triggers distribution measurement and determines a reconfiguration based on a result of the distribution measurement will be described in more detail with reference to FIG. 8 to FIG. 10 later.

As described above, the acquiring unit 610 may be configured to acquire a density of user equipments in a signal coverage of the communication device 600 serving as a master D2D device. In addition, the acquiring unit 610 may estimate a density of user equipments in the signal coverage of the communication device 600 by using a broadcast signal (a second broadcast signal) transmitted by a user equipment which does not serve as a slave device served by the communication device 600 as a distribution measurement signal. The broadcast signal may include a D2D discovery signal, a D2D synchronization signal or a newly defined signal and so on.

For example, a user equipment in the signal coverage of the communication device 600 which is not served by the communication device 600 may transmit a broadcast signal containing a user identity (a second broadcast signal) (such as a D2D discovery signal) with a certain signal strength, in response to a broadcast signal (a first broadcast signal) related to a distribution measurement request from the communication device 600, or spontaneously. The communication device 600 may intercept second broadcast signals from user equipments around, for example, count the user equipments of which a strength of the second broadcast signal exceeds a predetermined signal strength threshold. An identifier of a user equipment may be obtained by signal analysis, and the same user equipment is counted only once. A sum of the number of users which are not served by the communication device 600 within a period of time and the number of slave user equipments which are served may be counted, and the sum is divided by an effective signal coverage area to obtain a density of the user equipments in the current effective signal coverage. It should be understood by those skilled in the art that the way for obtaining the density of the user equipments is not limited to the exemplary manner.

For example, a user equipment may report its position to a certain geographical position management module, and the communication device 600 serving as the master user equipment may report its power configuration information to the geographical position management module. Therefore, the geographical position management module may calculate the number of the user equipments in the effective signal coverage of the communication device 600 and divide the number of the user equipments by the effective signal coverage area to obtain a density of users in the current effective signal coverage.

Figure 7:
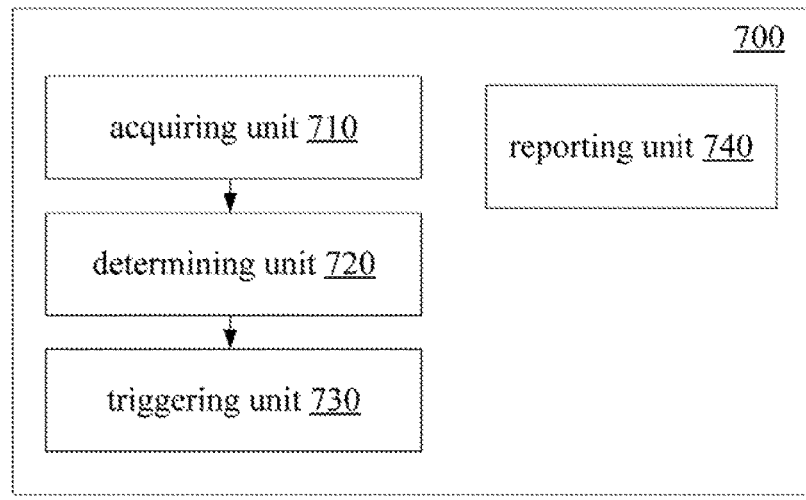
FIG. 7 is a block diagram of a configuration example of a communication device according to yet another embodiment of the present disclosure.

Accordingly, as shown in FIG. 7, a communication device 700 according to an embodiment of the present disclosure includes an acquiring unit 710, a determining unit 720, a triggering unit 730 and a reporting unit 740. Configurations of the determining unit 720 and the triggering unit 730 are similar to the determining unit 120 or 620 and the triggering unit 130 or 630 described above with reference to FIG. 1 and FIG. 6, respectively. The reporting unit 740 is configured to report information on a position and/or a transmission power of the communication device 700 to a network infrastructure such as an eNB. The acquiring unit 710 is configured to acquire information on a density of user equipments in a signal coverage of the communication device 700 from the network infrastructure.

In whatever way the information on the density of the user equipments in the signal coverage is obtained, the determining unit of the communication device according to the embodiment of the present disclosure can determine an operation parameter of the communication device according to a predetermined relation between the density of the user equipments and a network performance. Specifically, the operation parameter may include a transmission power of the communication device and/or the maximum number of slave devices served by the communication device. The maximum number of the slave devices served by the communication device is a parameter for limiting the number of slave D2D devices associated with one master D2D device, that is, the number of the slave D2D devices served by the master D2D device should be less than or equal to the maximum number.

For example, configurations of the master/slave D2D device in which a network performance is optimized for different node densities may be estimated by pre-calculation. The network performance may include a system capacity and a system throughput and so on. The configurations of the master/slave D2D device may include: a distribution density of master D2D devices, or a minimum distance between master D2D devices; a maximum power of a master D2D device or an effective signal coverage radius of a master D2D device; the maximum number of slave D2Ds which may be associated with one master D2D and so on.

In addition, node densities may be divided into different intervals and results of node distribution measurements are determined based on the intervals. For example, if a node density measured currently and the node density measured previously belong to different intervals, the operation parameter is adjusted, for example, initiating a reselection of the master/slave D2D and an adjustment of the power of the master D2D device. In another aspect, if the node density measured currently and the node density measured previously belong to the same interval, it is further determined whether a difference between the two measurement results exceeds a specific threshold. If the difference exceeds the threshold, the operation parameter is adjusted; otherwise, the current operation parameter is not changed. As an example, the specific threshold may be set as a half of a length of the interval. For example, if an interval of the number of nodes is [a, b], the threshold may be set as |a−b|/2.

Next, an exemplary manner in which the optimal configuration of the master/slave D2D is estimated according to the node density is described.

Firstly, a reference mutually exclusive distance is calculated. Given a transmission power and a reference user parameter of a base station, a mutually exclusive distance of master D2D devices under a D2D network structure is calculated as a reference mutually exclusive distance, according to a certain optimization object. The reference user parameter includes: a user density $\lambda_0$ (an average user density counted by a network may be selected), an allowable maximum transmission power $P_{0,max}$ for communication between users, an SINR threshold T required for normal communication between users, and a path loss index $\alpha$. Specifically, an effective transmission distance between user equipments may be determined according to the transmission power. The user equipments can not communicate if a distance between the user equipments is greater than the effective transmission distance. That is, distribution of master user equipments should at least satisfy that slave user equipments served by a master user equipment may transmit and receive a signal with the master user equipment. In addition, according to the transmission power and the SINR requirement of user equipments, the distribution of master user equipments should further satisfy that a signal received on a link formed between a master user equipment and a served slave user equipment thereof using the same spectrum resource and an interference on the link should satisfy the SINR requirement. For example, based on the above optimization object, the reference mutually exclusive distance $D_0$ may be determined by many manners.

Subsequently, a coverage radius $r_0$ of a master D2D device and a user coverage radius $r_1$ corresponding to an actual user density $\lambda_1$ are calculated according to a capacity of the master D2D device. The capacity of the master D2D device indicates the number $N_s$ of slave D2D devices which can be supported by the master D2D device. According to the setting, a user distribution conforms to a PPP model. The number of nodes in a specific graph A is $\lambda_0|A|$, where $|A|$ indicates an area of the graph A. Therefore it can be obtained $\lambda_0 \pi r_0^2 = N_s + 1$. Further, it can be obtained $$r_0 = \sqrt{\frac{N_s+1}{\lambda_0 \pi}}.$$

Similarly, it can be obtained $$r_1 = \sqrt{\frac{N_s+1}{\lambda_1 \pi}}.$$

Subsequently, an actual mutually exclusive distance $D_1$ and an actual maximum power $P_{1,max}$ corresponding to the actual node density are obtained according to the reference mutually exclusive distance. The actual maximum power ensures that a reception power of a user at an edge of a coverage is consistent with that in the reference case and does not exceed the allowable maximum transmission power $P_{0,max}$ for communication between users, thus it can be obtained $$P_{s,max} = \min\left\{P_{0,max}, P_{0,max}\left(\frac{\lambda_0}{\lambda_2}\right)^{\frac{\alpha}{2}}\right\}.$$

Under the assumption, the mutually exclusive distance is directly proportional to the effective coverage radius of the master D2D device, thus it can be obtained that the actual mutually exclusive distance is $$D_1 = D_0\left(\frac{\lambda_0}{\lambda_1}\right)^{\frac{\alpha}{2}}.$$

It should be understood that the way for determining the operation parameter of the communication device by the determining unit of the communication device according to the embodiment of the present disclosure based on the density of user equipments is not limited to specific details described in the above embodiment.

According to a relation between a target value of the determined operation parameter and current an actual value of the operation parameter, the determining unit may further determine an adjustment manner of the operation parameter according to different principles. For example, in a case that an actual transmission power of the communication device is greater than the determined target transmission power, the determining unit may determine the adjustment manner of the operation parameter based on the following principles:

(1) reducing the transmission power while ensuring a signal quality of the slave device; or (2) removing the served slave devices sequentially in an ascending order of communication qualities of the slave devices and reducing the transmission power, until the transmission power does not exceed the determined transmission power.

In the above manner (1), a transmission power of the master device is reduced as much as possible without changing the number of the served slave devices, such that the transmission power of the master device is closer to the target transmission power, to improve the system performance.

In the above manner (2), the served slave devices are removed according to priorities of the communication qualities, such that the transmission power of the master device is close to the target transmission power as much as possible, to improve the system performance.

However, the present disclosure is not limited to the two manners described above. For example, the two manners may be combined, and the adjustment manner of the parameter can be determined with a tradeoff between the maintaining of the number of the slave devices and the reducing of the transmission power of the master device.

In addition, there is also a possible case where the actual transmission power of the communication device is less than the determined target transmission power, and it is expected to increase the number of the salve devices served by the communication device. In this case, the adjustment manner of the operation parameter may be determined similarly, for example, increasing the transmission power of the communication device and increasing the number of the slave devices and so on.

After the determining unit determines the adjustment manner of the operation parameter of the communication device, the triggering unit may trigger a corresponding process for adjusting the parameter. For example, it may be triggered to adjust a transmission power of the communication device according to the determined transmission power. In addition, a D2D communication releasing request may be transmitted to the slave device of the communication device, and a D2D communication establishing request may be transmitted to a user equipment, in the signal coverage of the communication device, which does not serve as the slave device of the communication device, and so on.

Next, exemplary processes in which a D2D device initiates distribution measurement and determines a reconfiguration based on a result of the distribution measurement when the communication device according to an embodiment of the present disclosure is a master D2D device, are described with reference to FIG. 8 to FIG. 10.

Figure 8:
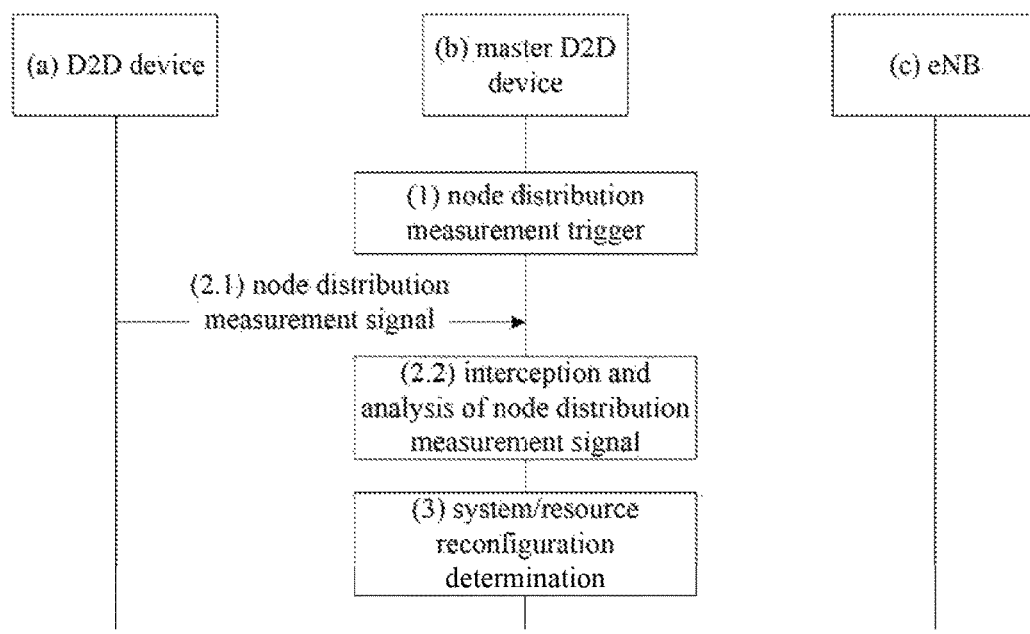
FIG. 8 is a schematic diagram of an exemplary process according to an embodiment of the present disclosure.

In an exemplary process shown in FIG. 8, at process (1), a master D2D device, i.e., the communication device according to the embodiment, triggers node distribution measurement. As described above, the trigger condition may include, for example, a change in an available resource of the master D2D device, a change in a state of the master D2D device itself, and a change in a state of the served slave D2D device, and so on.

At (2.1), the D2D device (which does not serve as a slave device yet) autonomously transmits a node distribution measurement signal. The node distribution measurement signal may carry an ID of the D2D device and/or a transmission power of the signal. The signal may be a signal defined by the D2D system such as a D2D discovery signal or a D2D synchronization signal, or may be a new reference signal which is defined specially. The node distribution measurement signal may be transmitted periodically by the D2D device, or may be triggered by the D2D device in some conditions. The conditions include, for example, reduction of a link quality, adjusting of a power and moving of a node. In this case, the master D2D device may directly enter an interception phase for the signal after triggering the node distribution measurement.

At (2.2), the D2D device analyzes the intercepted node distribution measurement signal to confirm a change in the number of nodes around. Different analysis methods are used according to different information carried in the node distribution measurement signal in the system. For example, if the signal is a heartbeat signal transmitted with a fixed power, the master D2D device may estimate a distance from a transmission point according to t strength of the received signal. For example, a strength of a signal received by the master D2D device transmitted by a D2D node at an edge of the effective signal coverage of the master D2D device may be used as a threshold. A D2D device is determined to be located in the effective coverage of the master D2D device if a strength of the received corresponding signal is higher than the threshold; and a D2D device is determined to be located out of the effective coverage of the master D2D device if a strength of the received corresponding signal is lower than the threshold. The master D2D device may count only the nodes in its effective coverage. The node distribution measurement signal may carry an ID of a transmission node, or signals for respective transmission nodes may be distinguished in other ways, to avoid repetitive counting. If there is no node distinguishing information and each D2D device transmits a signal periodically with a fixed frequency, the number of repetitive counting may be estimated based on a detection time range.

Next, in process (3), the master D2D device determines the adjustment of the operation parameter according to an interception result of the distribution measurement signal.

During the exemplary process shown in FIG. 8, the D2D device autonomously transmits a node distribution measurement signal. However, the D2D device may transmit the node distribution measurement signal in response to triggering from the master D2D device.

Figure 9:
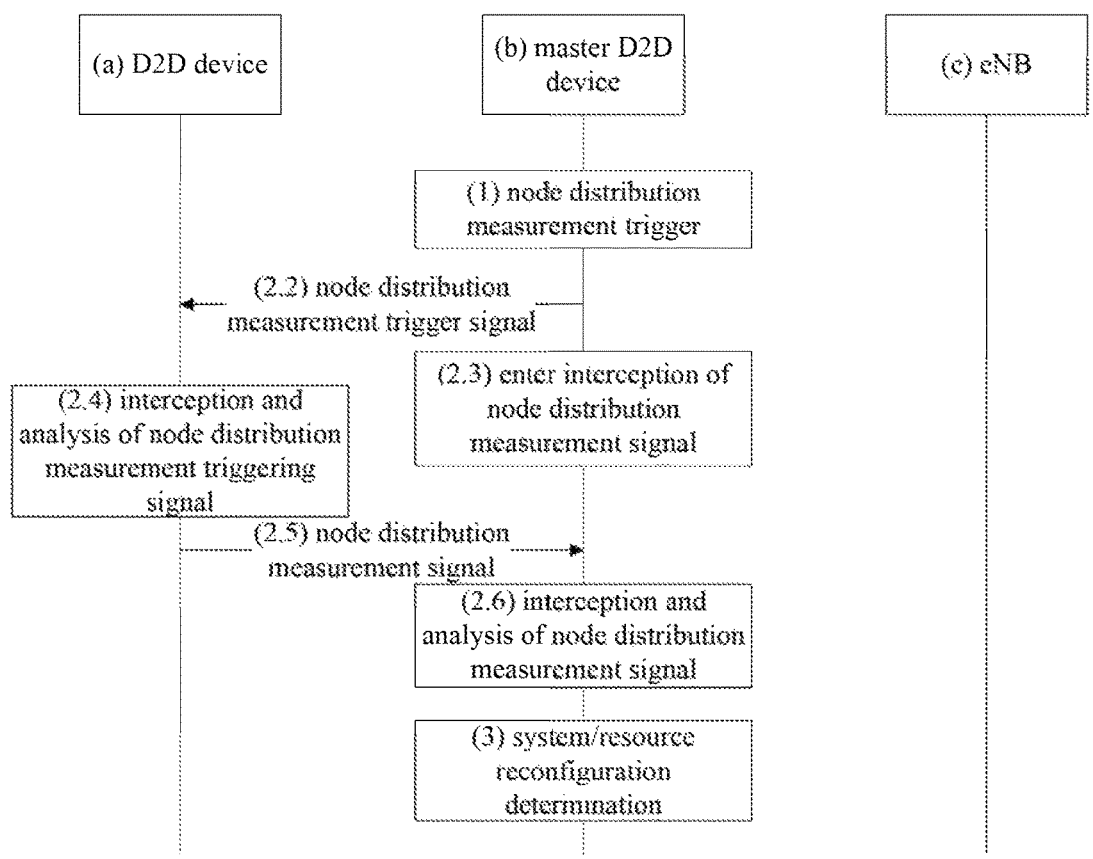
FIG. 9 is a schematic diagram of another exemplary process according to an embodiment of the present disclosure.

As shown in FIG. 9, at process (1), the master D2D device triggers node distribution measurement.

At (2.2), the master D2D device transmits a node distribution measurement triggering signal, which may carry an ID of the master D2D device and/or a transmission power of the signal. The signal may be a signal defined by the D2D system, for example, a D2D discovery signal or a D2D synchronization signal, or may be a new reference signal which is defined specially.

At (2.3), the master D2D device enters an interception phase for the node distribution measurement signal.

At (2.4), the D2D device may intercept and analyze the node distribution measurement triggering signal from the master D2D device. The D2D device may periodically trigger the interception and analysis, or may trigger the interception and analysis in a case of a poor channel condition, to search for a better serving node. The D2D device selects whether to transmit a node distribution measurement signal according to an analysis result. For example, if an analyzed ID of the master D2D device belongs to an allowable and willing feedback range ("the willing feedback range" means that feedback is performed to only a master D2D of which an ID belongs to a certain range, for example), it is triggered to transmit a next node distribution measurement signal. In addition, the D2D device may estimate, based on a transmission power of a signal and a strength of the received signal, an attenuation condition of the signal, so as to determine a link quality; and feedback is performed only in a case that the link quality exceeds a certain threshold (the threshold may be a threshold which can ensure normal communication or a quality of a link providing a service currently); otherwise, the D2D may ignore the node distribution measurement triggering signal.

At (2.5), the D2D device transmits a node distribution measurement signal which may carry an ID of the D2D device and/or a transmission power of the signal. The signal may include a D2D discovery signal, a D2D synchronization signal or a new reference signal defined specially.

At (2.6), the master D2D device analyzes the intercepted node distribution measurement signal, to confirm a change in the number of nodes around. Different analysis methods are used according to different information carried in the node distribution measurement signal in the system. Specific ways are similar to the process (2.2) illustrated with reference to FIG. 8 above, which are not repeated here.

Next, At process (3), the master D2D device determines the adjustment of the operation parameter according to an interception result of the distribution measurement signal.

During an exemplary process shown in FIG. 9, a D2D device transmits a node distribution measurement signal in response to triggering of a master D2D device. In addition, the master D2D device may transmit a node distribution measurement request to a base station, and the base station requests the D2D device to transmit a node distribution measurement signal.

Figure 10:
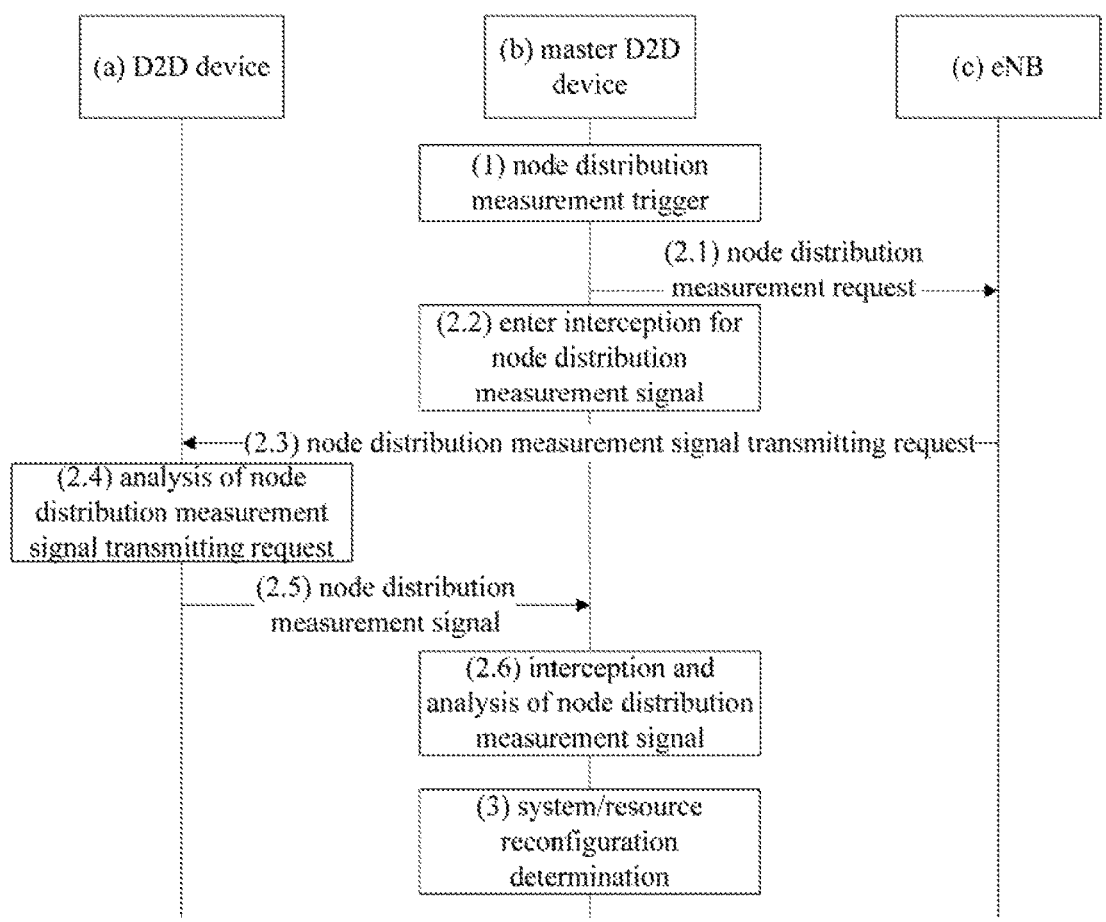
FIG. 10 is a schematic diagram of yet another exemplary process according to an embodiment of the present disclosure.

As shown in FIG. 10, during process (1), a master D2D device triggers node distribution measurement.

At (2.1), the master D2D device transmits a node distribution measurement request to an eNB, and the request may include a geographical position of the master D2D device, a radius of an effective signal coverage and the number of nodes in a current effective signal coverage and so on. The request may be transmitted by a physical uplink control channel (PUCCH), a certain defined media access control element (MAC CE) or high layer signaling such as RRC signaling.

At (2.2), the master D2D device enters an interception phase for the node distribution measurement signal.

At (2.3), the eNB transmits a node distribution measurement signal transmitting request to a D2D device satisfying a condition. The request may include an ID of the master D2D device, a time range for measurement and/or time points corresponding to each of the D2D devices which are randomly generated during the time range. The request may be transmitted by broadcasting or a communication link for each selected D2D device. The request may be transmitted by PDCCH, a certain defined MAC CE or high layer signaling such as RRC signaling.

At (2.4), the D2D device analyzes the received node distribution measurement signal transmitting request, and selects whether to transmit a node distribution measurement signal according to an analysis result. If an analyzed ID of the master D2D device belongs to the allowable and willing feedback range, it is triggered to transmit a next node distribution measurement signal. Further, if the node distribution measurement signal transmitting request transmitted by the eNB includes information of the master D2D device such as a position and a coverage, the D2D device may estimate, based on a transmission power of a signal and a strength of the received signal, an attenuation condition of the signal, to determine a link quality. Feedback is performed only in a case that the link quality exceeds a certain threshold.

Subsequent processes (2.5) to (3) are similar to the processes (2.5) to (3) described with reference to FIG. 9, which are not repeated here.

The exemplary embodiments in a case that the communication device is the master D2D device are described above. Next, an exemplary embodiment in which the communication device is a network side infrastructure such as a base station is described.

Referring to FIG. 1 again, in a case that the communication device 100 according to the embodiment of the present disclosure is a network infrastructure such as a base station, the information on the distribution of the user equipments in the dynamic network acquired by the acquiring unit 110 of the communication device 100 may include a density of the user equipments in a specific region. The specific region includes for example a service coverage of the base station or a part of the coverage. More specifically, the acquiring unit 110 may estimate the density according to information from master devices in the specific region and/or information from the user equipments in the specific region which do not serve as a slave device.

Accordingly, the determining unit 120 of the communication device 100 according to the embodiment is configured to determine an operation parameter of a user equipment in the region according to a predetermined relation between the density of the user equipments and a network performance.

Specifically, the operation parameter determined by the determining unit 120 may include a target density of master devices, a spacing threshold of master devices, a transmission power threshold of a master device and a threshold of the number of slave devices served by a master device and so on.

As described above, the operation parameter that optimize the network performance for different node densities may be estimated by pre-calculation, and specific ways are similar to the exemplary ways described in detail above, which are not repeated here.

The triggering unit 130 may be configured to transmit a master device canceling request to a master device in the specific region, transmit a master device setting request to a user equipment in the region or transmit a power alteration instruction and/or a slave user alteration instruction to a master device in the region. In other words, in the embodiment, the communication device 100 serving as the base station may determine the specific selection of master D2D devices, and determine the operation parameter of a master D2D such as a transmission power and the maximum number of slave D2D devices. For example, the base station may select master D2D terminals sequentially according to a descending order of strength of signal from D2D device to the base station, and ensures that a mutually exclusive distance is satisfied therebetween.

Next, exemplary processes that a base station initiates distribution measurement and determines a reconfiguration based on a result of the distribution measurement when the communication device according to an embodiment of the present disclosure is the base station are described with reference to FIG. 11 to FIG. 13 and an exemplary process that a master D2D device initiates distribution measurement and a base station determines a reconfiguration based on a result of the distribution measurement is described with reference to FIG. 14, without repeating specific details described above with reference to FIG. 8 to FIG. 10.

Figure 11:
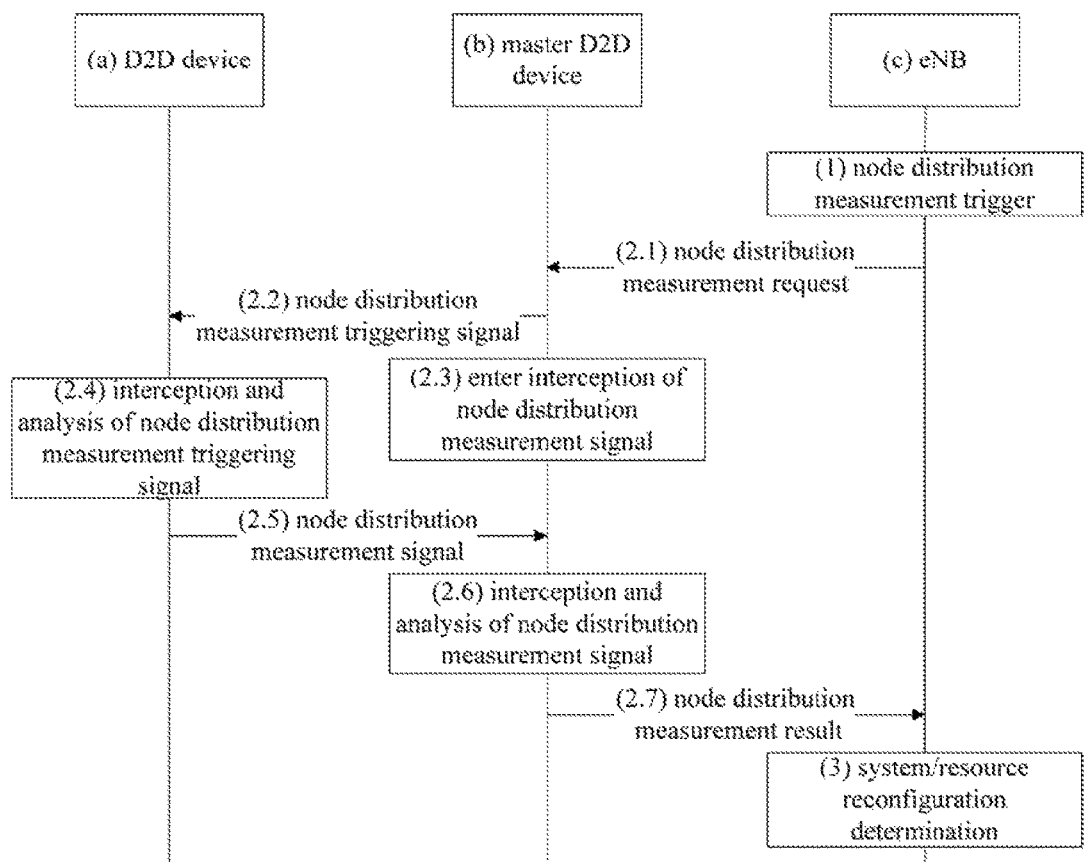
FIG. 11 is a schematic diagram of still another exemplary process according to an embodiment of the present disclosure.

During an exemplary process shown in FIG. 11, at process (1), the base station triggers node distribution measurement. As described above, the triggering conditions may include, for example, an eNB needs to perform resource allocation and scheduling on the D2D device according to the node distribution measurement result, for example, adjusting a power level or an available resource pool of the D2D device and so on.

At (2.1), the eNB transmits a node distribution measurement request to the selected master D2D device. The request may be transmitted by PDCCH, a certain defined MAC CE or a high layer signaling such as RRC signaling.

Subsequent processes (22) to (2.6) are similar to the processes (2.2) to (2.6) described above with reference to FIG. 9, which are not repeated here.

At (2.7), the master D2D device reports the node distribution measurement result to the eNB.

At (3), the base station determines an adjustment of an operation parameter based on the node distribution measurement result.

Figure 12:
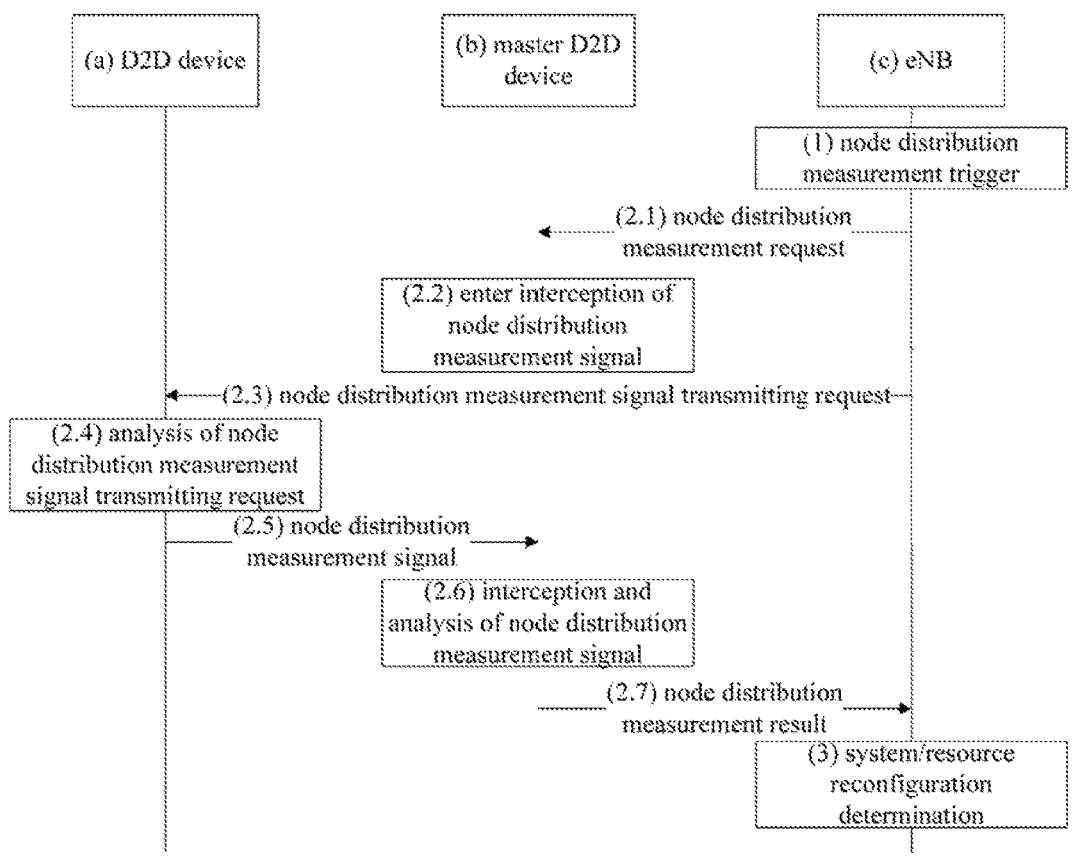
FIG. 12 is a schematic diagram of yet another exemplary process according to an embodiment of the present disclosure.

In an exemplary process shown in FIG. 12, in process (1), the base station triggers node distribution measurement.

At (2.1), the eNB transmits a node distribution measurement request to the selected master D2D device.

Subsequent processes (2.2) to (2.6) are similar to the processes (2.2) to (2.6) described above with reference to FIG. 10, which are not repeated here.

At (2.7), the master D2D device reports the node distribution measurement result to the eNB.

At (3), the base station determines the adjustment of the operation parameter based on the node distribution measurement result.

Figure 13:
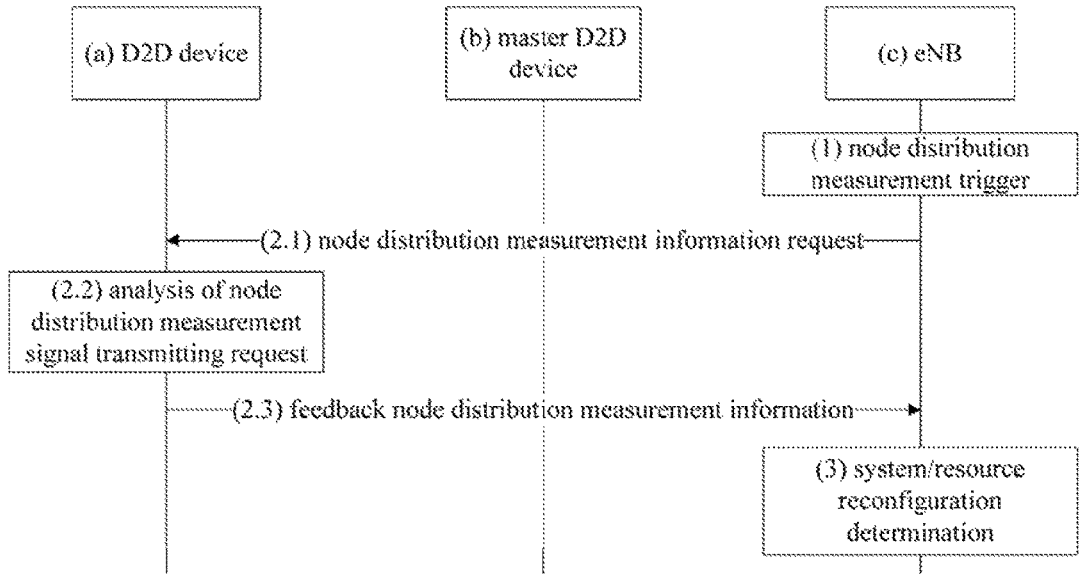
FIG. 13 is a schematic diagram of still another exemplary process according to an embodiment of the present disclosure.

In an exemplary process shown in FIG. 13, at process (I), a base station triggers node distribution measurement.

At (2.1), the eNB transmits a node distribution measurement signal transmitting request to a D2D device satisfying a condition. The request may be transmitted via PDCCH, a certain defined MAC CE or a high layer signaling such as RRC signaling.

At (2.2), the D2D device analyzes the received node distribution measurement signal transmitting request, and decides whether to transmit a node distribution measurement signal according to an analysis result.

At (2.3), the D2D device feeds back node distribution measurement information to the eNB. The information may carry position information of the transmission node (for example a longitude and a latitude of the node). Therefore, the base station may determine distribution of the D2D device based on the position information.

At (3), the base station determines an adjustment of the operation parameter based on the node distribution measurement result.

Figure 14:
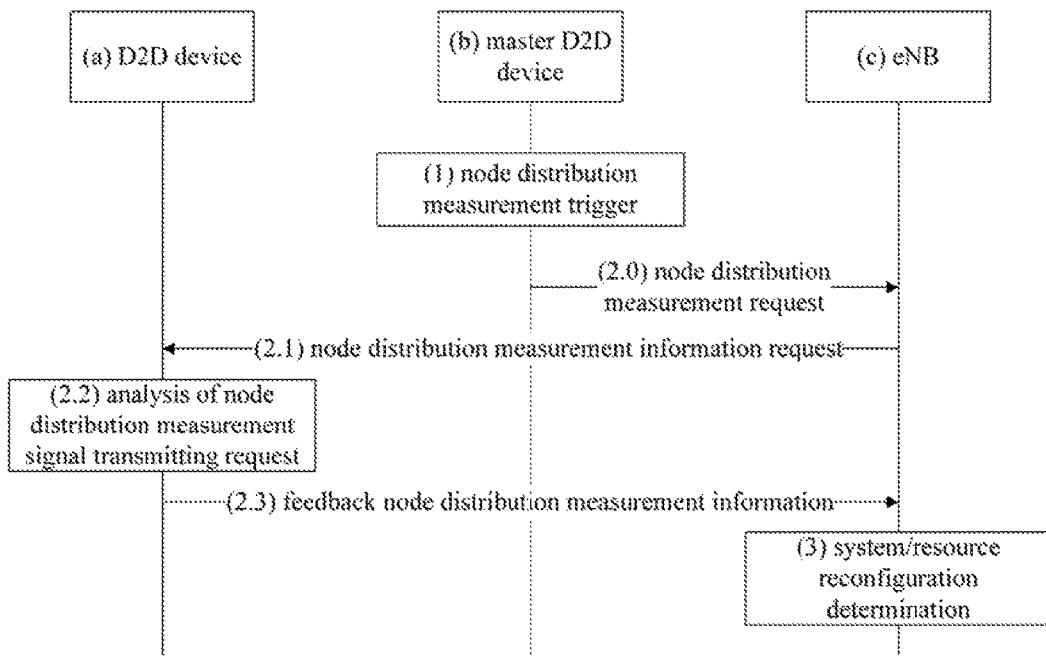
FIG. 14 is a schematic diagram of yet another exemplary process according to an embodiment of the present disclosure.

The example shown in FIG. 14 differs from the example shown in FIG. 13 in that: at process (1), the master D2D device triggers node distribution measurement; and at process (2.0), the master D2D device transmits a node distribution measurement request to the eNB. Subsequent processes (2.1) to (3) are similar to corresponding processes described with reference to FIG. 13, which are not repeated here.

Next, exemplary processes of a dynamic network reconfiguration triggered by the communication device according to an embodiment of the present disclosure are described with reference to FIG. 15 and FIG. 16.

Figure 15:
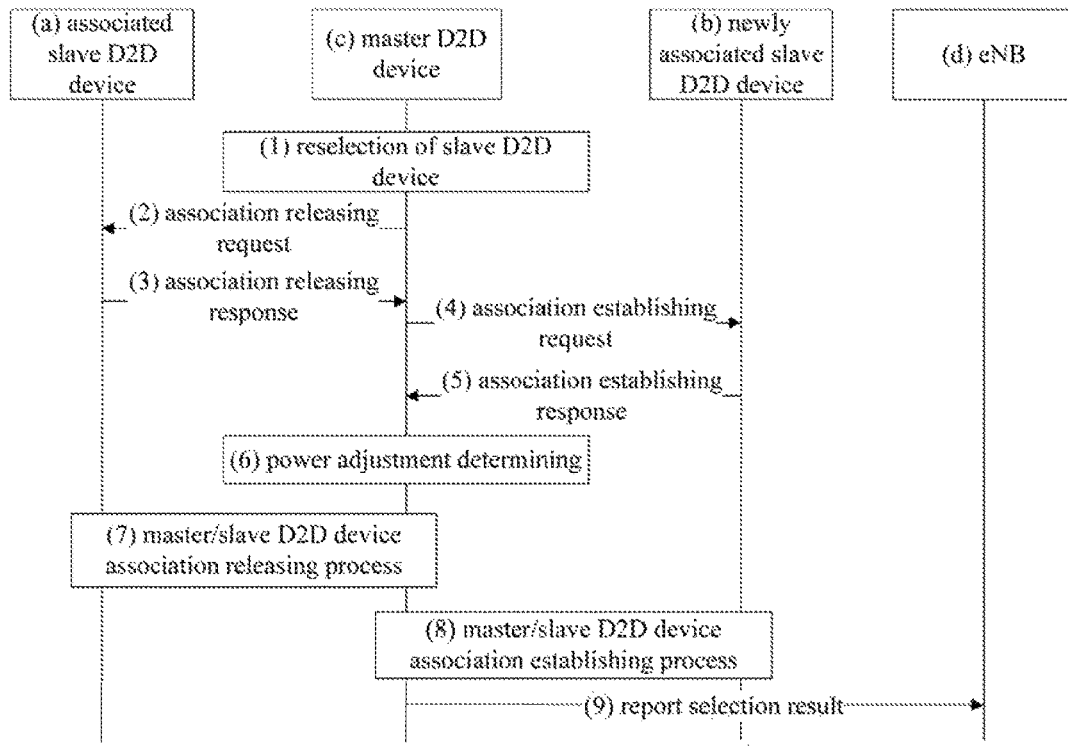
FIG. 15 is a schematic diagram of an exemplary process of adjusting configurations of a master device and a slave device.

FIG. 15 shows an example of a process that a master D2D device reselects a salve D2D device and adjusts a power of the master D2D device.

At process (1), the master D2D device initiates reselection of the slave D2D device.

At process (2), the master D2D device transmits an association releasing request to a selected associated slave D2D device.

At process (3), the associated slave D2D device feeds back an association releasing response.

At process (4), the master D2D device transmits an association establishing request to a selected and newly associated slave D2D device.

At process (5), the newly associated slave D2D device feeds back an association establishing response.

At process (6), the master D2D device determines whether to adjust a power.

At process (7), the master D2D device and the selected associated slave D2D device perform an association releasing process.

At process (8), the master D2D device and the selected unassociated slave D2D device perform an association establishing process.

At process (9), the master D2D device reports an association result to a base station.

Specifically, in process (1), the master D2D device may reselect the served slave D2D devices in a descending order of strengths of the received D2D device signals, such that the number of the slave D2D devices does not exceed the maximum number of slave D2D devices which can be carried. In process (6), the master D2D device adjusts a power according to a link condition of a D2D device in the selected nodes having a lowest signal strength, such that a quality of a signal received by the D2D device reaches a normal communication level. If the power exceeds a maximum transmission power allowed by the system for a master D2D to serve a slave D2D, the slave D2D device with the lowest signal strength may be removed, a slave D2D device with a second lowest signal strength is considered, until the transmission power of the master D2D does not exceed the maximum transmission power. In process (9), the selection result reported to the base station by the master D2D device may include: the number of the served slave D2D devices and/or a transmission power level for serving slave D2D devices and so on.

Figure 16:
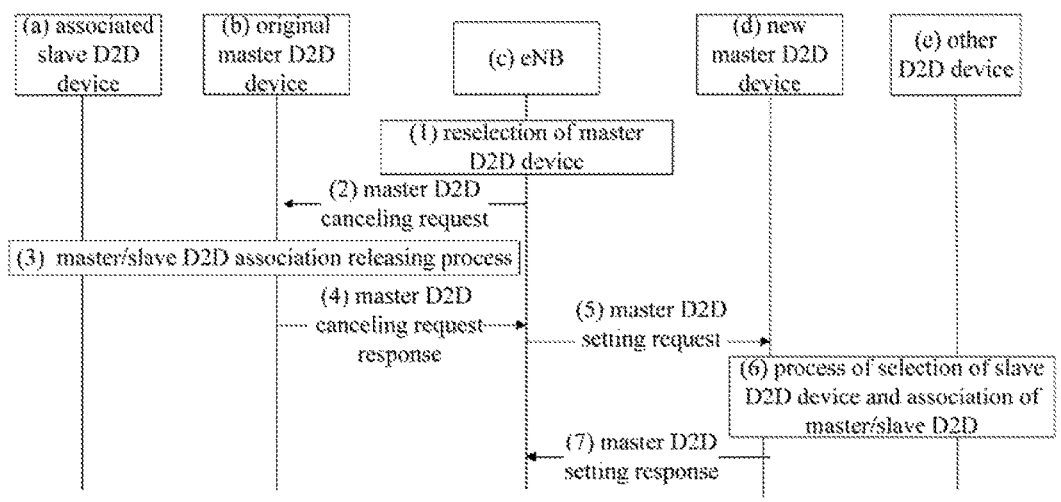
FIG. 16 is a schematic diagram of another exemplary process of adjusting the configurations of the master device and the slave device.

FIG. 16 shows an exemplary process that a base station determines reselection of a master/slave D2D and power adjustment of the master D2D device.

At process (1), the base station reselects a master D2D device according to a node distribution measurement result.

At process (2), the base station transmits a master D2D canceling request to an original D2D device.

At process (3), the original D2D device and a served slave D2D device thereof perform an association releasing process.

At process (4), the original D2D device feeds back a master D2D canceling response to the eNB.

At process (5), the base station transmits a master D2D setting request to a selected new master D2D device. The request may include a maximum available power of the master D2D device and the maximum number of served slave D2D devices and so on.

At process (6), the new master D2D device performs a process of selection and association for slave D2D devices.

At process (7), the new master D2D device feeds back a master D2D setting response to the eNB.

Specifically, at process (1), the base station may select master D2D terminals sequentially in a descending order of strength of signal from D2D terminal to the base station, and ensuring a mutually exclusive distance therebetween is satisfied. That is, there is no other master D2D device in a circle centered at the selected master D2D device and having a radius of the mutually exclusive distance. At process (5), the base station notifies the selected D2D of a selection result which includes the D2D device serving as the master D2D device, a maximum transmission power of the D2D device and the maximum number of slave D2D devices which can be associated with the D2D device.

In addition, the D2D device may autonomously perform master/slave D2D reselection and power adjustment of the D2D device.

Alternatively, the base station may transmit a master/slave D2D reselection request to all D2D devices. The request includes a configuration of master/slave D2D devices in an interval to which the node distribution measurement result belongs. The D2D device may become a master D2D device by competing and negotiating, so as to satisfy a distribution condition of master D2D devices. Then, the master D2D device selects a served slave D2D device and establishes a connection with the slave D2D device by reselecting the slave D2D device and adjusting a power of the master D2D device.

Next, a communication method performed by the communication device according to the embodiment of the present disclosure is described without repeating the specific details described above.

Figure 17:
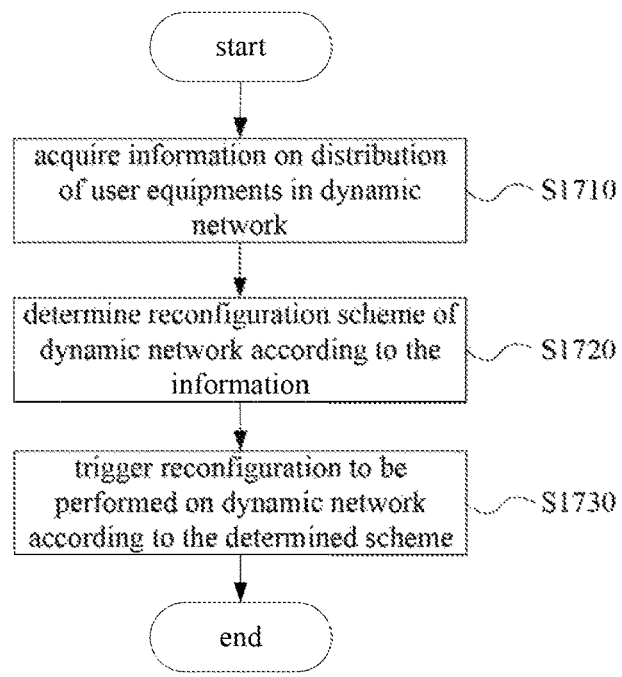
FIG. 17 is a flowchart showing a process example of a communication method according to an embodiment of the present disclosure.

As shown in FIG. 17, the communication method according to an embodiment of the present disclosure includes the following steps.

In step S1710, information on distribution of user equipments in a dynamic network is acquired, where the user equipments include at least a slave device which obtains a communication service via a master device during a device-to-device communication.

In step S1720, a reconfiguration scheme of the dynamic network is determined according to the acquired information.

In step S1730, a reconfiguration to be performed on the dynamic network according to the determined scheme is triggered.

The method according to the embodiment of the present disclosure may be performed by a network infrastructure such as a base station, may be performed by a user equipment serving as a master D2D device or may be performed by the network infrastructure in cooperation with the communication device. In other words, the above steps S1710, S1720 and S1730 each may be performed by the network infrastructure, or the user equipment, or the network infrastructure in cooperation with the user equipment.

In addition, embodiments of the present disclosure also include a user equipment serving as a non-master D2D device, the user equipment may serve as "(a) D2D device" described in FIG. 8 to FIG. 14 in the dynamic network.

Figure 18:
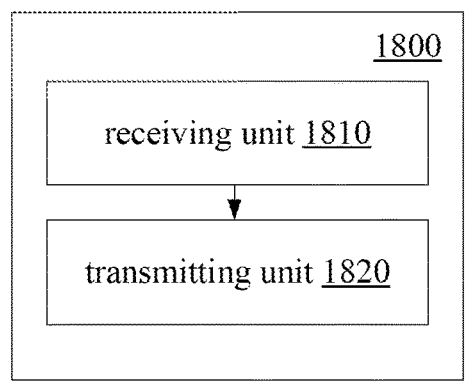
FIG. 18 is a block diagram showing a configuration example of a communication device for user side according to an embodiment of the present disclosure.

As shown in FIG. 18, a communication device 1800 according to the embodiment includes a receiving unit 1810 and a transmitting unit 1820.

The receiving unit 1810 is configured to receive a transmitting request from a user equipment (for example, a master D2D device) or a network infrastructure (for example, a base station). For example, the receiving unit 1810 may receive the transmitting request by PDCCH or MAC CE.

The transmitting unit 1820 is configured to transmit, when the communication device 1800 does not serve as a slave device, a reference signal for determining distribution of the communication device 1800 in the dynamic network based on the received transmitting request. The reference signal may include identifier information of the communication device 1800.

In a case that a time configuration for transmitting the reference signal is indicated in the transmitting request, the transmitting unit 1820 may transmit the reference signal according to the indicated time configuration.

In addition, the receiving unit 1810 may receive a broadcast signal including a transmitting request from the user equipment, and the transmitting unit 1820 may transmit the reference signal only in a case that a strength of the received broadcast signal including the transmitting request is higher than a predetermined level.

According to an embodiment of the present disclosure, a communication method performed by a user equipment is further provided, and the user equipment may serve as "(a) D2D device" described in FIG. 8 to FIG. 14 in a dynamic network.

Figure 19:
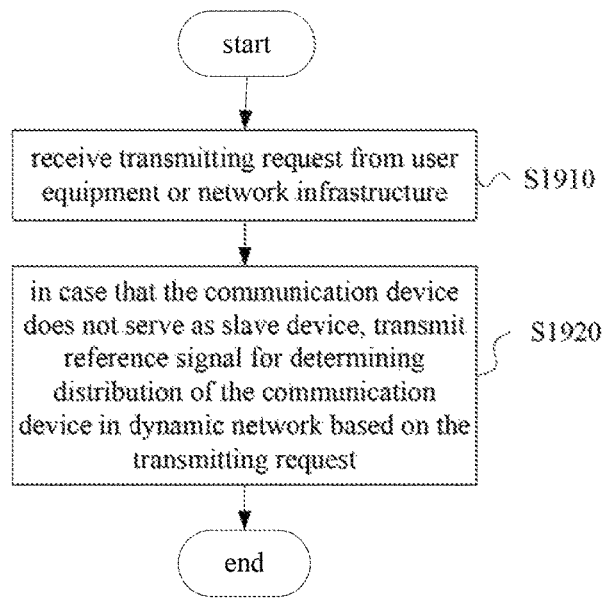
FIG. 19 is a flowchart showing a process example of a communication method according to an embodiment of the present disclosure.

As shown in FIG. 19, the communication method performed by the communication device according to the embodiment includes the following steps.

In step S1910, a transmitting request from a user equipment or a network infrastructure is received.

In step S1920, in a case that the communication device does not serve as a slave device, a reference signal for determining distribution of the communication device in a dynamic network is transmitted based on the request.

In addition to the above embodiments, according to an embodiment of the present disclosure, a communication device is further provided. The communication device includes a circuit or one or more processors configured to: acquire information on distribution of user equipments in a dynamic network, where the user equipments include at least a slave device which obtains a communication service via a master device during a device-to-device communication; determine a reconfiguration scheme of a dynamic network according to the acquired information; and trigger a reconfiguration to be performed on the dynamic network according to the determined scheme.

In addition, according to another embodiment of the present disclosure, a communication device is provided, which includes a circuit or one or more processors configured to: receive a transmitting request from a user equipment or a network infrastructure; and transmit, when the communication device does not serve as a slave device, a reference signal for determining distribution of the communication device in a dynamic network.

As an example, various steps of the methods above and various modules and/or units of the devices above may be implemented as software, firmware, hardware or a combination thereof. In a case of implementing by software or firmware, programs consisting of the software for implementing the methods above are installed to a computer with a dedicated hardware structure (for example a general-purpose computer 2000 shown in FIG. 20) from the storage medium or the network. The computer can perform various types of functions when installed with various types of programs.

Figure 20:
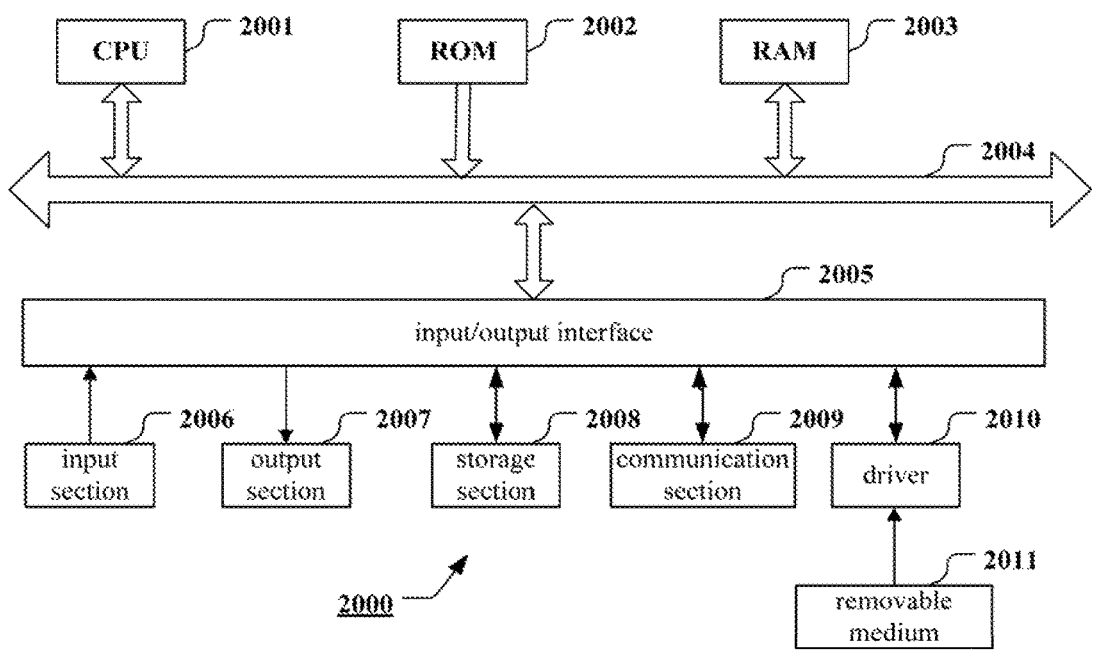
FIG. 20 is a block diagram showing an exemplary structure of a computer for implementing the method and the device of the present disclosure.

In FIG. 20, a central processing unit (CPU) 2001 performs various types of processing according to programs stored in a read only memory (ROM) 2002 or programs loaded from a storage section 2008 to a random access memory (RAM) 2003. Data required when the CPU 2001 performs various types of processing is also stored in the RAM 2003 as needed. The CPU 2001, the ROM 2002 and the RAM 2003 are linked to each other via a bus 2004. An input/output interface 2005 is also linked to the bus 2004.

The following components are linked to the input/output interface 2005: an input section 2006 (including a keyboard, and a mouse and so on), an output section 2007 (including a display, for example a cathode ray tube (CRT) and a liquid crystal display (LCD), and a loudspeaker), a storage section 2008 (including a hard disk and so on), and a communication section 2009 (including a network interface card for example a LAN card, and a modem). The communication section 2009 performs communication processing via a network for example the Internet. A driver 2010 may also be linked to the input/output interface 2005 as needed. A removable medium 2011 for example a magnetic disk, an optical disk, a magnetic-optical disk and a semiconductor memory may be installed on the driver 2010 as needed, such that computer programs read from the removable medium 2011 are installed on the storage section 2008 as needed.

In a case of performing the series of processing described above by software, programs consisting of the software are installed from the network for example the Internet or the storage medium for example the removable medium 2011.

Those skilled in the art should understand that the storage medium is not limited to the removable medium 2011 shown in FIG. 20 which stores programs and is distributed separately from the device to provide the programs to the user. Examples of the removable medium 2011 include: a magnetic disk (including a floppy disk (registered trademark), an optical disk (including a compact disk read only memory (CD-ROM) and a digital versatile disk (DVD), a magnetic-optical disk (including a mini disk (MD) (registered trademark)), and a semiconductor memory. Alternatively, the storage medium may be a hard disk included in the ROM 2002 and the storage section 2008 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is also included in the present disclosure. The storage medium includes but not limited to a floppy disk, an optical disk, a magnetic-optical disk, a storage card and a memory stick and so on.

The embodiments of the present disclosure further relate to an electronic device in the following. In a case that the electronic device is for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device); and one or more remote radio heads (RRH) located at positions different from the body. In addition, various types of terminals described in the following each may function as a base station to operate by performing functions of the base station temporarily or in a semi-permanent manner.

In a case that the electronic device is for user equipment side, the electronic device may be implemented as a mobile terminal (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

[Application Example on Terminal Device]

(First Application Example)

Figure 21:
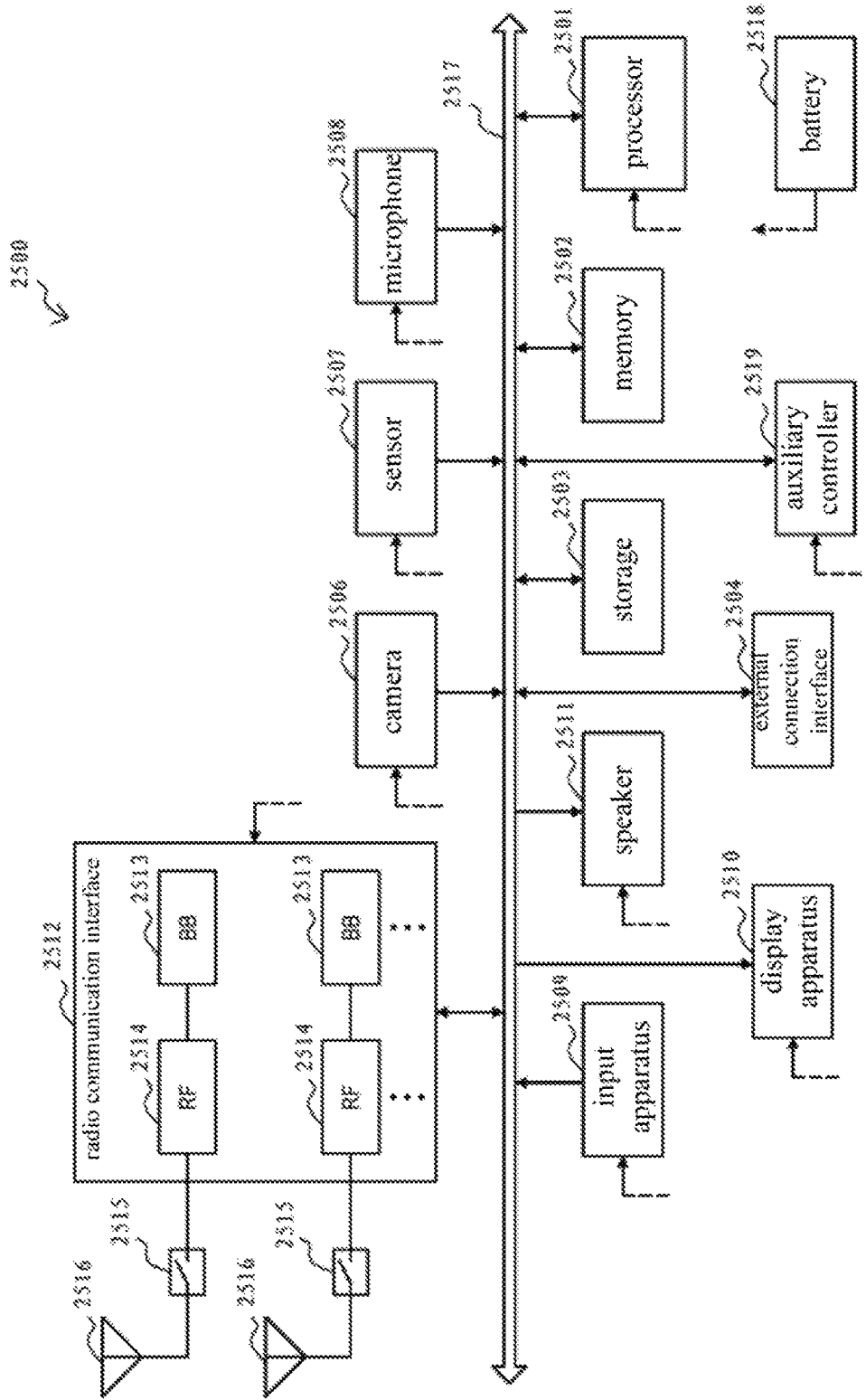
FIG. 21 is a block diagram showing a schematic configuration of a smart phone to which a content of the present disclosure may be applied.

FIG. 21 is a block diagram illustrating an example of a schematic configuration of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external apparatus such as a memory card and a universal serial bus (USB) apparatus to the smart phone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are input to the smart phone 2500 to audio signals. The input device 2509 includes, for example, a touch sensor configured to detect touch onto a screen of the display apparatus 2510, a keypad, a keyboard, a button, or a switch, and receive an operation or information input from a user. The display apparatus 2510 includes a screen such as a liquid crystal display (LCD) and an organic light-emitting diode (OLED) display, and displays an output image of the smart phone 2500. The speaker 2511 converts audio signals that are output from the smart phone 2500 to sounds.

The radio communication interface 2512 supports any cellular communication scheme such as LTE and LTE-Advanced, and performs radio communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 21. Although FIG. 21 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance radio communication scheme, a near field communication scheme, and a radio local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smart phone 2500 may include the multiple antennas 2516, as illustrated in FIG. 21. Although FIG. 21 illustrates the example in which the smart phone 2500 includes the multiple antennas 2516, the smart phone 2500 may also include a single antenna 2516.

Furthermore, the smart phone 2500 may include the antenna 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input device 2509, the display device 2510, the speaker 2511, the radio communication interface 2512, and the auxiliary controller 2519 to each other. The battery 2518 supplies power to blocks of the smart phone 2500 illustrated in FIG. 21 via feeder lines, which are partially shown as dashed lines in the figure. The auxiliary controller 2519 operates a minimum necessary function of the smart phone 2500, for example, in a sleep mode.

(Second Application Example)

Figure 22:
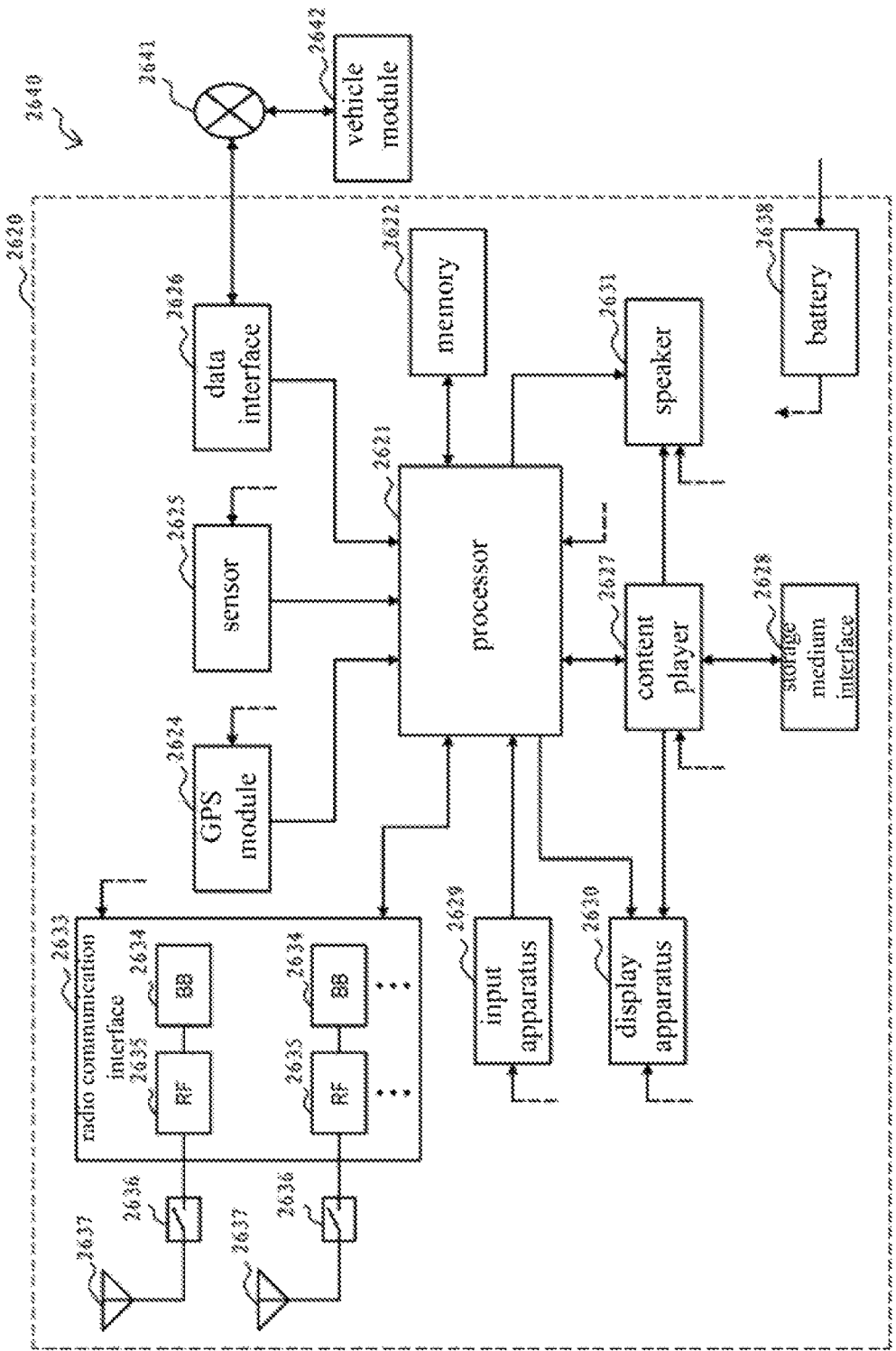
FIG. 22 is a block diagram showing an example of a schematic configuration of a vehicle navigation device to which the content of the present disclosure may be applied.

FIG. 22 is a block diagram of an example of a schematic configuration of an automobile navigation device 2620 to which the technology of the present disclosure may be applied. The automobile navigation device 2620 includes: a processor 2621, a memory 2622, a global positioning system (GPS) module 2624, a sensor 2625, a data interface 2626, a content player 2627, a storage medium interface 2628, an input apparatus 2629, a display apparatus 2630, a speaker 2631, a radio communication interface 2633, one or more antenna switches 2636, one or more antennas 2637 and a battery 2638.

The processor 2621 may be for example a CPU or a SoC, and controls a navigation function and other functions of the automobile navigation device 2620. The memory 2622 includes RAM and ROM, and stores program executed by the processor 2621 and data.

The GPS module 2624 measures a position of the automobile navigation device 2620 (such as a latitude, a longitude and a height) using a GPS signal received from a GPS satellite. The sensor 2625 may include a group of sensors, such as a gyro sensor, a geomagnetic sensor and an air pressure sensor. The data interface 2626 is connected to a vehicle network 2641 via a terminal not shown, and acquires data generated by the vehicle (such as vehicle speed data).

The content player 2627 reproduces content stored in a storage medium (such as CD and DVD) inserted into the storage medium interface 2628. The input apparatus 2629 includes a touch sensor, a button or a switch configured to detect touch onto a screen of the display apparatus 2630, and receive an operation or information input by a user. The display apparatus 2630 includes a screen such as an LCD or an OLED display, and displays an image with a navigation function or reproduced content. The speaker 2631 outputs sounds of a navigation function or reproduced content.

The radio communication interface 2633 supports any cellular communication scheme (such as LTE and LTE-advanced) and performs radio communication. The radio communication interface 2633 may generally include for example a BB processor 2634 and an RF circuit 2635. The BB processor 2634 may perform for example encoding/decoding, modulating/demodulating and multiplexing/demultiplexing, and performs various types of signal processing for radio communication. In addition, the RF circuit 2635 may include for example a mixer, a filter and an amplifier, and transmits and receives a radio signal via the antenna 2637. The radio communication interface 2633 may be a chip module having a BB processor 2634 and an RF circuit 2635 integrated thereon. As shown in FIG. 22, the radio communication interface 2633 may include multiple BB processors 2634 and multiple RF circuits 2635. Although FIG. 22 shows the example in which the radio communication interface 2633 includes multiple BB processors 2634 and multiple RF circuits 2635, the radio communication interface 2633 may also include a single BB processor 2634 or a single RF circuit 2635.

Further, in addition to the cellular communication scheme, the radio communication interface 2633 may support other types of radio communication schemes, such as a short distance radio communication scheme, a near field communication scheme and a wireless LAN scheme. In this case, for each radio communication scheme, the radio communication interface 2633 may include the BB processor 2634 and the RF circuit 2635.

Each of the antenna switches 2636 switches connection destinations of the antennas 2637 among multiple circuits (such as circuits for different radio communication schemes) included in the radio communication interface 2633.

Each of the antennas 2637 includes a single or multiple antenna elements (such as multiple antenna elements included in an MIMO antenna) and is used for the radio communication interface 2633 to transmit and receive a radio signal. As shown in FIG. 22, the automobile navigation device 2620 may include multiple antennas 2637. Although FIG. 22 shows the example in which the automobile navigation device 2620 includes multiple antennas 2637, the automobile navigation device 2620 may include a single antenna 2637.

In addition, the automobile navigation device 2620 may include an antenna 2637 for each radio communication scheme. In this case, the antenna switch 2636 may be omitted from the configuration of the automobile navigation device 2620.

The battery 2638 supplies power for blocks of the automobile navigation device 2620 shown in FIG. 22 via feeder lines, which are shown partially as dotted lines in the figure. The battery 2638 accumulates the power provided by the vehicle.

The technology of the present disclosure may also be implemented as a vehicle system (or a vehicle) 2640 including one or more of the automobile navigation device 2620, the vehicle network 2641 and the vehicle module 2642. The vehicle module 2642 generates vehicle data (such as a vehicle speed, an engine speed and fault information), and outputs the generated data to the vehicle network 2641.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. A communication device, comprising:
   processing circuitry configured to
   acquire information on distribution of user equipments in a dynamic network, wherein the user equipments comprise at least a slave device which obtains a communication service via a master device during a device-to-device communication,
   acquire a density of slave devices in a signal coverage of the communication device, wherein the communication device is a master user equipment, the density of slave devices being acquired from a network infrastructure based on one or more of a position and a transmission power of the master user equipment reported to the network infrastructure, determine an operation parameter of the master user equipment according to a predetermined relation between the density of slave devices and a network performance, the operation parameter comprising one or more of a transmission power of the master user equipment and the maximum number of slave devices served by the master user equipment, determine a reconfiguration scheme of the dynamic network according to the information, and trigger a reconfiguration to be performed on the dynamic network according to the determined scheme.

2. The communication device according to claim 1, wherein the reconfiguration scheme comprises one or more of a reselection of the master device and a resetting of an operation parameter of the master device.

3. The communication device according to claim 2, wherein the resetting of the operation parameter of the master device comprises one or more of adjusting a transmission power of the master device and adjusting a slave device served by the master device.

4. The communication device according to claim 1, wherein the processing circuitry is further configured to
trigger, based on a predetermined event, a user equipment in a signal coverage of the communication device to transmit a distribution measurement signal to determine information on the distribution of the user equipments.

5. The communication device according to claim 4, wherein the predetermined event comprises at least one of:
a change in a mobility characteristic of the communication device satisfying a predetermined condition;
a change in a signal transmission parameter of the communication device exceeding a predetermined threshold;
a timer for triggering a distribution measurement satisfying a timing condition; and
a communication state between the communication device and a slave user equipment served by the communication device satisfying a predetermined condition.

6. The communication device according to claim 4, wherein the processing circuitry is further configured to
trigger a user equipment in the signal coverage of the communication device to transmit the distribution measurement signal by at least one of:
transmitting a first broadcast signal related to a distribution measurement request to the user equipment in the signal coverage of the communication device, wherein the first broadcast signal comprises a reference signal for a device-to-device communication; and
transmitting a distribution measurement request message to a serving base station of the communication device to trigger, by the serving base station, the user equipment in the signal coverage of the communication device to transmit the distribution measurement signal.

7. The communication device according to claim 1, wherein the processing circuitry is further configured to
estimate the density by using, as a distribution measurement signal, a second broadcast signal transmitted by a user equipment which does not serve as a slave device served by the communication device, wherein the second broadcast signal comprises a discovery signal for a device-to-device communication or a synchronization signal for the device-to-device communication.

8. The communication device according to claim 1, wherein the processing circuitry is further configured to
adjust the transmission power of the communication device according to the determined transmission power; and/or
transmit a device-to-device communication releasing request to a slave device of the communication device and/or transmit a device-to-device communication establishing request to a user equipment in the signal coverage of the communication device.

9. The communication device according to claim 1, wherein the communication device is the network infrastructure.

10. A communication device for user side, comprising:
processing circuitry configured to
receive a transmitting request from a user equipment or a network infrastructure; and
transmit, based on the transmitting request, a reference signal to a master device for determining a distribution of the communication device in a dynamic network in a case where the communication device does not serve as a slave device which obtains a communication service via the master device during a device-to-device communication, the master device being configured to estimate a density of user equipments based on the reference signal transmitted by the communication device, the reference signal being a distribution measurement signal comprising a discovery signal for a device-to-device communication or a synchronization signal for the device-to-device communication,
wherein the master device is configured to determine an operation parameter of the master device according to a predetermined relation between the density of slave devices and a network performance, the operation parameter comprising one or more of a transmission power of the master device and the maximum number of slave devices served by the master device.

11. The communication device according to claim 10, wherein the processing circuitry is further configured to
receive the transmitting request via a physical downlink control channel or a media access control element.

12. The communication device according to claim 10, wherein in a case where a time configuration for transmitting the reference signal is indicated in the transmitting request, the processing circuitry is further configured to
transmit the reference signal according to the indicated time configuration.

13. The communication device according to claim 10, wherein the processing circuitry is further configured to
receive, from user equipment, a broadcast signal comprising the transmitting request, and
transmit the reference signal only in a case where a strength of the received broadcast signal comprising the transmitting request is higher than a predetermined level.

14. The communication device according to claim 10, wherein the reference signal comprises identification information of the communication device.

15. A communication method performed by a communication device, comprising:
receiving a transmitting request from a user equipment or a network infrastructure; and
transmitting, based on the transmitting request, a reference signal to a master device for determining a distribution of the communication device in a dynamic network in a case where the communication device does not serve as a slave device which obtains a communication service via the master device during a device-to-device communication, the master device being configured to estimate a density of user equipments based on the reference signal transmitted by the communication device, the reference signal being a distribution measurement signal comprising a discovery signal for a device-to-device communication or a synchronization signal for the device-to-device communication, wherein the master device is configured to determine an operation parameter of the master device according to a predetermined relation between the density of slave devices and a network performance, the operation parameter comprising one or more of a transmission power of the master device and the maximum number of slave devices served by the master device.

* * * * *